(12) United States Patent
Johannessen (10) Patent No.: US 12,146,642 B1
(45) Date of Patent: Nov. 19, 2024

(54) SPLIT CORE ISOLATED POWER

(71) Applicant: B/E AEROSPACE, INC., Winston Salem, NC (US)

(72) Inventor: Eric Johannessen, Holbrook, NY (US)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 18/311,122

(22) Filed: May 2, 2023

(51) Int. Cl.
| | | |
|---|---|---|
| *F21V 23/02* | (2006.01) | |
| *B64D 11/00* | (2006.01) | |
| *F21V 23/00* | (2015.01) | |

(52) U.S. Cl.
CPC ............ *F21V 23/026* (2013.01); *B64D 11/00* (2013.01); *F21V 23/005* (2013.01); *B64D 2011/0038* (2013.01)

(58) Field of Classification Search
CPC ...... F21V 23/02; F21V 23/026; F21V 23/005; B64D 2011/0038
See application file for complete search history.

(56) References Cited

U.S. PATENT DOCUMENTS

| | | | |
|---|---|---|---|
| 6,768,408 B2 | 7/2004 | Gilmore et al. | |
| 7,564,336 B2 | 7/2009 | Derks | |
| 7,646,279 B2 | 1/2010 | Limpkin et al. | |
| 7,821,375 B2 | 10/2010 | Dong et al. | |
| 8,072,308 B2 | 12/2011 | Aboumrad et al. | |
| 8,203,410 B2 | 6/2012 | Sundstrom et al. | |
| 10,102,952 B2 | 10/2018 | Pagenkopf | |
| 10,878,987 B2 | 12/2020 | Omolayo | |
| 2006/0262525 A1* | 11/2006 | Barbeau | F21S 6/001 362/157 |
| 2007/0223217 A1* | 9/2007 | Hsu | H02J 7/0042 362/183 |
| 2013/0265748 A1* | 10/2013 | Hau | F21S 9/02 362/183 |
| 2015/0230312 A1* | 8/2015 | Akiya | H02J 50/12 315/70 |
| 2021/0088204 A1* | 3/2021 | Hsu | F21V 23/02 |

* cited by examiner

*Primary Examiner* — William N Harris
(74) *Attorney, Agent, or Firm* — SNELL & WILMER L.L.P.

(57) ABSTRACT

A lighting unit is provided. The lighting unit includes a first circuit board, a second circuit board, a light array mounted on the first circuit board, and a controller mounted on the first circuit board and coupled to the light array. The light unit further includes a first portion of an isolated power supply system mounted on the first circuit board and coupled to the controller and a second portion of the isolated power supply system mounted on the second circuit board. The first portion includes a first half magnetic core and a first set of windings and the second portion includes a second half magnetic core and a second set of windings. The first circuit board is coupled to the second circuit board so that a magnetic flux generated in the first half magnetic core is passed to the second half magnetic core.

18 Claims, 7 Drawing Sheets

SPLIT CORE ISOLATED POWER

FIELD

The present disclosure relates generally to lighting systems and methods and, more particularly, to splitting an inductor and/or transformer core to provide isolated power.

BACKGROUND

Today's rapidly evolving and uncertain world has driven the need for increased flexibility and modularity into modern aircraft systems. Part of that flexibility and modularity includes component and packaging miniaturization in order to reduce weight, cost, and size in aerospace applications. One typical implementation to reduce weight, cost, and size in some aerospace applications is by reducing or even eliminating the need for certain components through improving the design of other components within an aircraft.

SUMMARY

A lighting unit is disclosed. The lighting unit includes a first circuit board, a second circuit board, a light array mounted on the first circuit board and including a plurality of light emitting diodes (LEDs), a controller mounted on the first circuit board and coupled to the light array, a first portion of an isolated power supply system mounted on the first circuit board and coupled to the controller, where the first portion of the isolated power supply system includes a first half magnetic core and a first set of windings, and a second portion of the isolated power supply system mounted on the second circuit board where the second portion of the isolated power supply system includes a second half magnetic core and a second set of windings. The first circuit board is coupled to the second circuit board so that a magnetic flux generated in the first half magnetic core is passed to the second half magnetic core in response to a first electric current being generated in the second set of windings. A second electric current is generated in the first set of windings due to the magnetic flux is utilized by the controller to control and power the light array.

In various embodiments, the first half magnetic core is at least partially embedded in the first circuit board and where the second half magnetic core is at least partially embedded in the second circuit board. In various embodiments, the first set of windings is wrapped around a first exposed portion of the first half magnetic core and where the second set of windings is wrapped around a second exposed portion of the second half magnetic core. In various embodiments, the first set of windings is at least partially wrapped around a portion of the first half magnetic core embedded in the first circuit board and where the second set of windings is at least partially wrapped around a portion of the second half magnetic core embedded in the second circuit board.

In various embodiments, the first half magnetic core and the second half magnetic core are separated by an air gap when the first circuit board is coupled to the second circuit board. In various embodiments, the first circuit board is coupled to the second circuit board utilizing mechanical board coupling devices. In various embodiments, the first portion of the isolated power supply system, the first circuit board, and the controller are enclosed in a first housing and where the second portion of the isolated power supply system and the second circuit board are enclosed in a second housing, where the first housing and the second housing are waterproof housings.

In various embodiments, the first half magnetic core and the second half magnetic core together form a toroid shape magnetic core. In various embodiments, the first half magnetic core and the second half magnetic core together form a shell type magnetic core. In various embodiments, the first half magnetic core and the second half magnetic core together form a planar shape magnetic core.

Also disclosed herein is a light assembly for an aircraft cabin. The light assembly includes a housing defining a mating surface, a reflective surface, the housing extending having a back end being distal from a front end, the front end including a light outlet; and a lighting unit disposed proximate the back end. The lighting unit includes a first circuit board, a second circuit board, a light array mounted on the first circuit board and including a plurality of light emitting diodes (LEDs), a controller mounted on the first circuit board and coupled to the light array, a first portion of an isolated power supply system mounted on the first circuit board and coupled to the controller, the first portion of the isolated power supply system includes a first half magnetic core and a first set of windings, and a second portion of the isolated power supply system mounted on the second circuit board, the second portion of the isolated power supply system includes a second half magnetic core and a second set of windings. The first circuit board is coupled to the second circuit board so that a magnetic flux generated in the first half magnetic core is passed to the second half magnetic core in response to a first electric current being generated in the second set of windings. A second electric current is generated in the first set of windings due to the magnetic flux is utilized by the controller to control and power the light array.

In various embodiments, the first half magnetic core is at least partially embedded in the first circuit board and where the second half magnetic core is at least partially embedded in the second circuit board. In various embodiments, the first set of windings is wrapped around a first exposed portion of the first half magnetic core and where the second set of windings is wrapped around a second exposed portion of the second half magnetic core. In various embodiments, the first set of windings is at least partially wrapped around a portion of the first half magnetic core embedded in the first circuit board and where the second set of windings is at least partially wrapped around a portion of the second half magnetic core embedded in the second circuit board.

In various embodiments, the first half magnetic core and the second half magnetic core are separated by an air gap when the first circuit board is coupled to the second circuit board. In various embodiments, the first circuit board is coupled to the second circuit board utilizing mechanical board coupling devices. In various embodiments, the first portion of the isolated power supply system, the first circuit board, and the controller are enclosed in a first housing and where the second portion of the isolated power supply system and the second circuit board are enclosed in a second housing, where the first housing and the second housing are waterproof housings.

In various embodiments, the first half magnetic core and the second half magnetic core together form a toroid shape magnetic core. In various embodiments, the first half magnetic core and the second half magnetic core together form a shell type magnetic core. In various embodiments, the first half magnetic core and the second half magnetic core together form a planar shape magnetic core.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

In electronics devices there needs to be a power supply. This power supply may be Alternating Current (AC) to Direct Current (DC) (AC-DC) power supply or DC-DC power supply. Typically, these electronic devices benefit from electrical isolation for safety, communication, noise isolation, or customer requirements, among others. Typically, such electronic devices utilize inductors and/or transformers that have a magnetic core. In typical lighting systems, the inductors and/or transformers are located on a power module that utilizes a connector to couple to a circuit module the includes the one or more light emitting diodes (LEDs). In typical lighting systems, the inductors and/or transformers being located on the power module increases a height above a surface of a printed circuit board (PCB) of the power module due to the height of the inductor and/or transformer coupled to a surface of the printed circuit board (PCB) of the power module.

Disclosed herein are systems and methods to provide isolation while eliminating unnecessary components within lighting systems and lighting assemblies utilized in aircrafts. In various embodiments, the magnetic core of the inductor and/or the transformer is split such that one side of the core is on a power module portion of the lighting assembly and the other side of the core is on a circuit module portion of the lighting assembly. In various embodiments, by splitting the core in such a manner, an isolated power source is provided while eliminating the connector. Furthermore, in various embodiments, by splitting the core in such a manner, a height of the lighting assembly may be reduced as the inductor and/or the transformer is embedded in the PCB. Still further, in various embodiments, by embedding the split core in the PCB, the entire power module and/or circuit module may be encased on a sealed plastic housing that is waterproof. Accordingly, splitting the core of an inductor and/or transformer may reduce the size and weight of the lighting assembly while enhancing a reliability and isolation of the lighting assembly.

Figure 1:
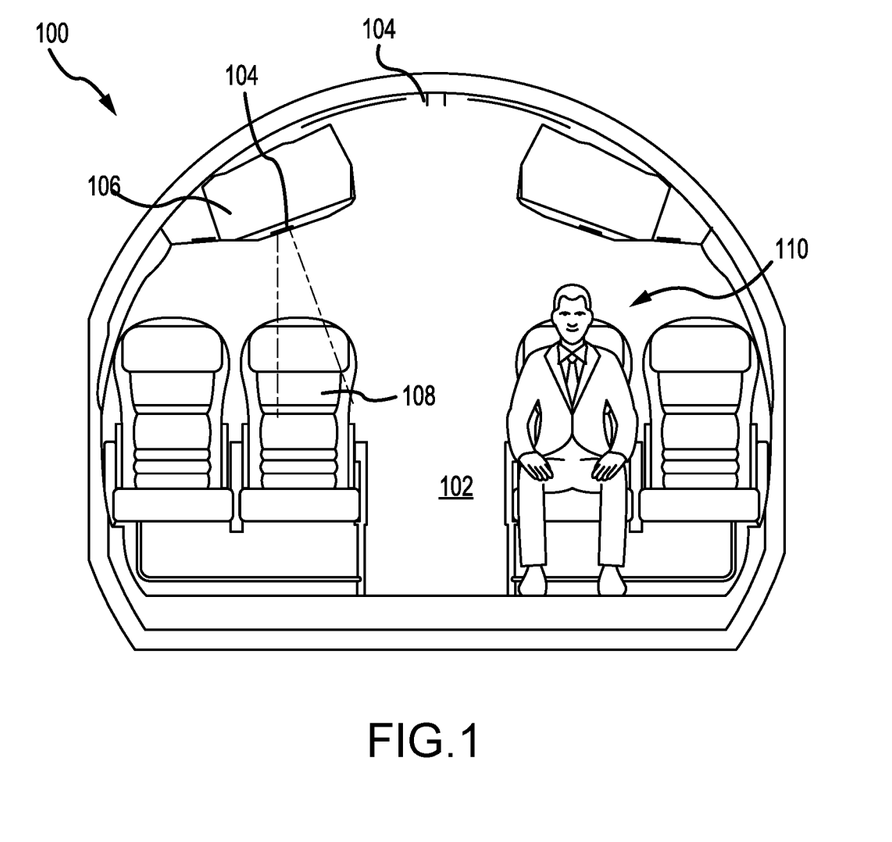
FIG. 1 illustrates an aircraft cabin, in accordance with various embodiments.

With reference to FIG. 1, a cabin 102 of an aircraft 100 is illustrated, in accordance with various embodiments. The aircraft 100 may be any aircraft such as an airplane, a helicopter, or any other aircraft. The aircraft 100 may include various lighting systems 104 that emit visible light to the cabin 102. The cabin 102 may include overhead bins 106, passenger seats 108 for supporting passengers 110, and other structures/surfaces which the visible light from the various lighting systems 104 may illuminate. In various embodiments, the various lighting systems 104 may provide various spectral weighting modes that are controlled and switched by the various lighting systems 104, enhancing a cabin feel/experience, in accordance with various embodiments. The various lighting systems 104 may be broken down into different addressable lighting regions that could be used on an aircraft. For example, the regions on an aircraft may include sidewall lighting, cross-bin lighting, over wing exit lighting, ceiling lighting, direct lighting, flex lights, reading lights, dome lights, lavatory lights, mirror lights, cockpit lights, cargo lights, etc. The regional breakdown of the lighting system allows lighting control over broad areas of the aircraft.

Figure 2:
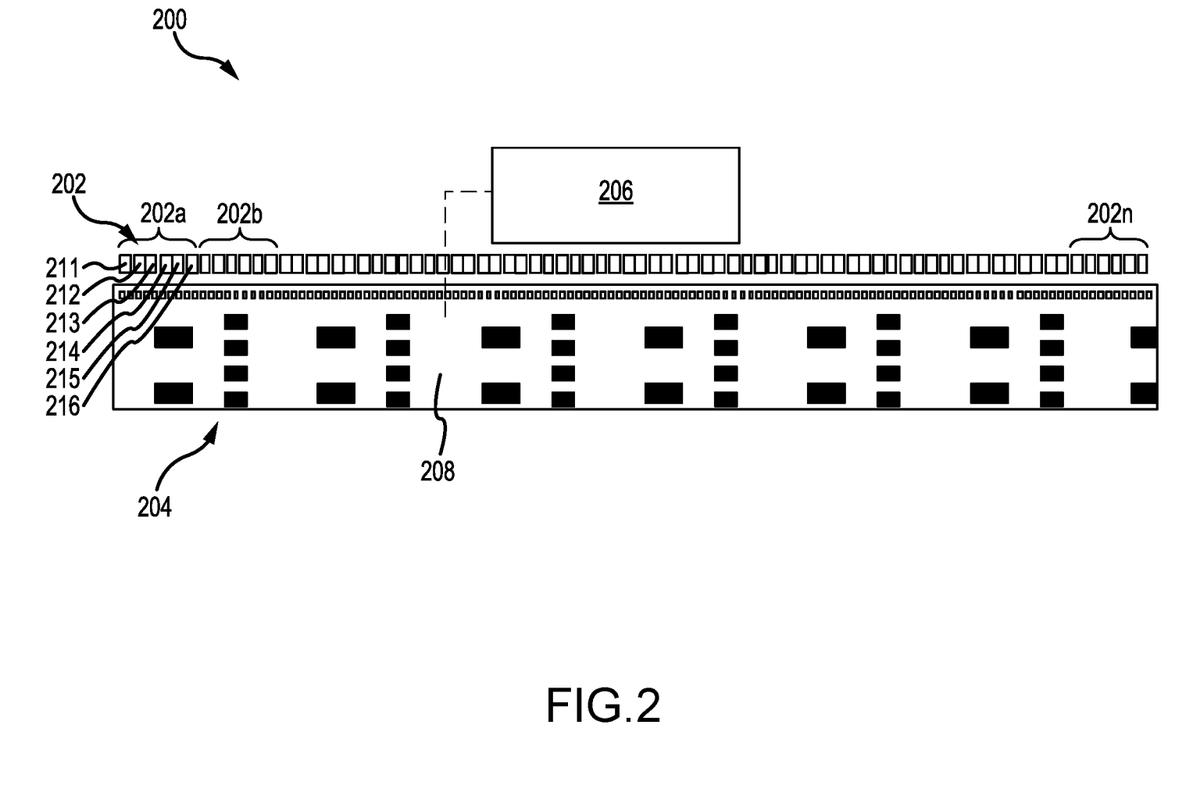
FIG. 2 illustrates a perspective view of a lighting unit including at least one lighting unit, circuitry, and a controller, in accordance with various embodiments.

With reference to FIG. 2, a lighting system 200 is provided, in accordance with various embodiments. The lighting system 200 may be one or more of the lighting systems 104 of the aircraft 100 from FIG. 1. The lighting system 200 generally includes a lighting unit 202, circuitry 204, and a controller 206, according to various embodiments. The lighting unit 202, according to various embodiments, includes a plurality of light-emitting diodes ("LEDs"), each LED in the plurality of LEDs configured to emit electromagnetic radiation in a predetermined wavelength. Additional details pertaining to the lighting unit 202, the circuitry 204, and the controller 206 are provided below.

The term "lighting unit," as used herein, generally refers to an array of discrete LEDs that are controlled to blend their respective radiations to collectively produce a desired color quality, color saturation, and color brightness of electromagnetic radiation. In various embodiments, the lighting unit disclosed herein is configured to transition between various spectral weighting modes, which are configured to generate a desired effect by optimizing a predetermined variable (e.g., hypergamut, CRI, brightness, etc.) within a predetermined domain (e.g., chromacity coordinates (x,y), color temperature (Kelvin), brightness (%), etc.).

In various embodiments, the lighting unit 202 include a first LED 211 configured to emit first electromagnetic radiation having a first wavelength of between about 630 nanometers ("nm") and about 740 nm (e.g., red light), a second LED 212 configured to emit second electromagnetic radiation having a second wavelength of between about 580 nm and about 630 nm (e.g., amber light), a third LED 213 configured to emit third electromagnetic radiation having a third wavelength between about 540 nm and about 580 nm (e.g., a lime), a fourth LED 214 configured to emit a fourth electromagnetic radiation having a fourth wavelength between about 510 nm and about 540 nm (e.g., green), a fifth LED 215 configured to emit a fifth electromagnetic radiation having a fifth wavelength between about 490 nm and 510 nm (e.g., cyan), and/or a sixth LED 216 configured to emit a sixth electromagnetic radiation having a sixth wavelength between about 440 nm and about 490 nm (e.g., blue).

In various embodiments, the lighting unit may include more or less than these six LEDs. For example, the lighting unit may include 5, 6, 7, or 8 LEDs, and these additional LEDs may be other colors, such as amber, cyan, etc. For example, a lighting unit having a (red, green, blue, white) configuration, (a red, green blue, ultraviolet, white configuration), a (white, white, blue configuration), a (white, white) configuration, etc. are within the scope of this disclosure. In various embodiments, the circuitry 204 of the lighting system 200 may include a circuit board 208 and may generally include various integrated circuit components which may carry out a variety of functions under the control of the controller 206. In various embodiments, the combination of the lighting unit 202 and the circuitry 204 is referred to as a lighting assembly, and the lighting assembly is configured to be driven/controlled by the controller 206, as described in greater detail below. The particular implementations shown and described herein are illustrative examples of an LED lighting assembly, and are thus not intended to otherwise limit the scope of the present disclosure in any way. For the sake of brevity, conventional electronics other components of the circuitry (such as power supplies and power modulators) may not be described in detail. The circuitry 204 is electrically coupled to the lighting unit 202 to supply respective driving signals to each of the LEDs 211, 212, 213, 214, 215, 216. In various embodiments, the lighting unit 202 may include additional LEDs, such as a white LED. In various embodiments, the lighting unit consists of only the six LEDs 211, 212, 213, 214, 215, 216 described above, and thus may not include other LEDs. In various embodiments, the lighting unit consists of only five LEDs. The lighting unit 202 may be replicated/repeated lighting units 202a-202n along a strip of circuit board 208. In various embodiments, the lighting unit 202 may include a diffuser lens (or diffuser lenses) covering the LEDs 211, 212, 213, and these lens(es) may include a glass material, a polymeric material, a polymethyl methacrylate material, and/or a polyamide material, among others.

In various embodiments, and with continued reference to FIG. 2, the controller 206 of the lighting system 200 may be affixed/integrated into the circuitry 204 or the controller 206 may be integrated into computer systems onboard an aircraft. The controller 206 in FIG. 2 is shown schematically, and thus the size, position, and orientation of the controller may be different than what is depicted in FIG. 2. In various embodiments, the controller 206 includes a processor. In various embodiments, the controller 206 is implemented in a single processor. In various embodiments, the controller 206 may be implemented as and may include one or more processors and/or one or more tangible, non-transitory memories and be capable of implementing logic. Each processor can be a general-purpose processor, a digital signal processor (DSP), an application specific integrated circuit (ASIC), a field programmable gate array (FPGA) or other programmable logic device, discrete gate or transistor logic, discrete hardware components, or any combination thereof. The controller 206 may include a processor configured to implement various logical operations in response to execution of instructions, for example, instructions stored on a non-transitory, tangible, computer-readable medium (i.e., the memory) configured to communicate with the controller 206. Furthermore, any number of conventional techniques for electronics configuration, signal processing and/or control, data processing and the like may be employed. Also, the processes, functions, and instructions may can include software routines in conjunction with processors, etc.

System program instructions and/or controller instructions may be loaded onto a non-transitory, tangible computer-readable medium having instructions stored thereon that, in response to execution by the processor, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The instructions stored on the memory of the controller 206 may be configured to perform various operations. Generally, the controller 206 electrically coupled to the circuitry 204 and is configured to transition between, by the processor, various spectral weighting modes. Controlling the spectral weighting modes of the light of the LEDs 211, 212, 213, 214, 215, 216 may include blending the first electromagnetic radiation, the second electromagnetic radiation, the third electromagnetic radiation, the fourth electromagnetic radiation, the fifth electromagnetic radiation, and the sixth electromagnetic radiation in a manner to achieve a desired effect by optimizing a predetermined variable (e.g., hypergamut, CRI, brightness, etc.) within a predetermined domain (e.g., chromacity coordinates, color temperature (Kelvin), brightness (%), etc.). In various embodiments, controlling the spectral weight modes of the light of the LEDs 211, 212, 213, 214, 215, 216 may include transitioning between various spectral weighting modes based on the desired effect for the cabin 102 from FIG. 1.

Figure 3:
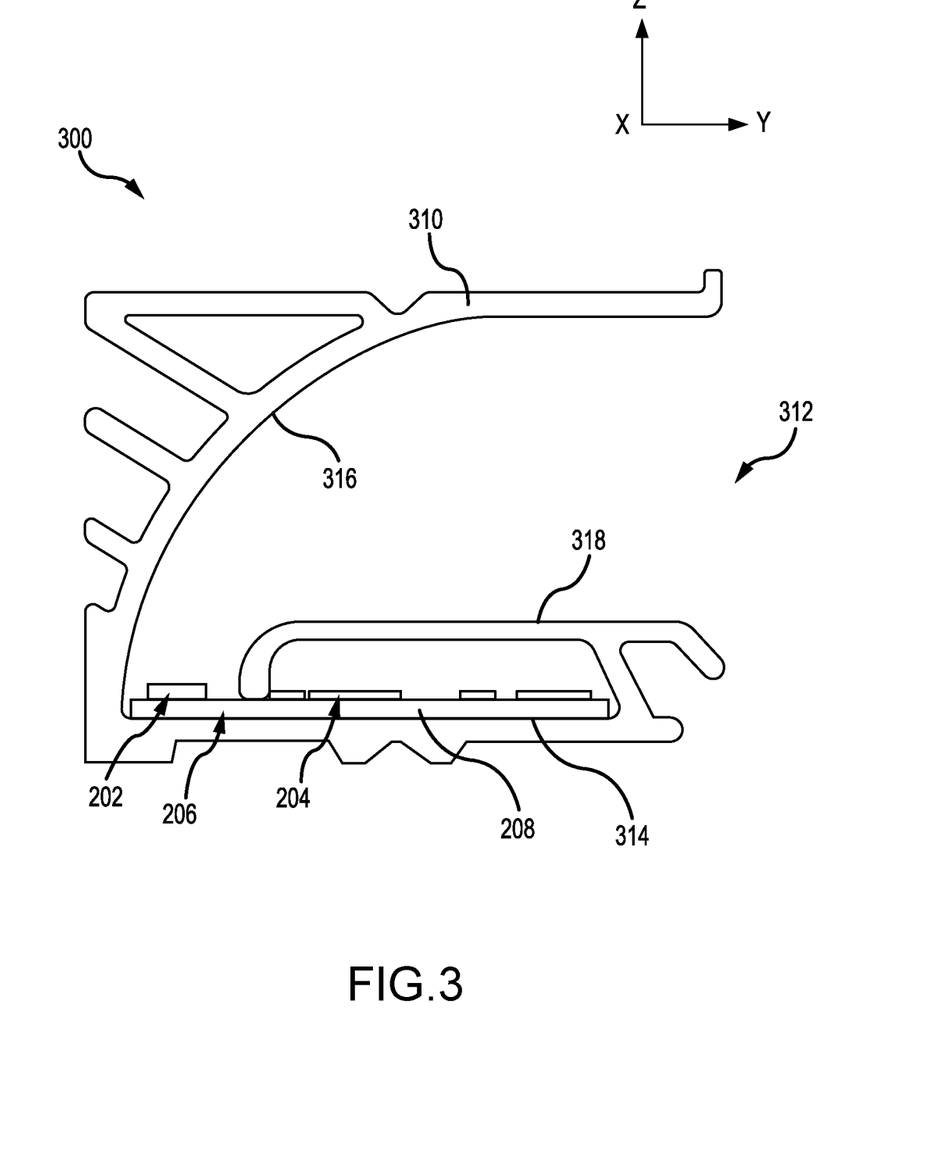
FIG. 3 illustrates a side view of a light assembly, in accordance with various embodiments.

Referring now to FIG. 3, a light assembly 300 is illustrated, in accordance with various embodiments. The light assembly 300 includes the lighting system 200 of FIG. 2. In various embodiments, the light assembly 300 includes a housing 310. The housing 310 defines a light outlet 312 at a front end of the housing. In various embodiments, the housing 310 defines a mating surface 314. The circuit board 208 of the lighting system 200 is configured to be coupled to the mating surface 314, via an adhesive, fasteners or the like. In various embodiments, the circuitry 204 is housed within a portion 318 of the housing 310, whereas the lighting unit 202 is disposed external to the portion 318 of the housing. The light assembly 300 further includes a reflective surface 316 extending from a location proximate the lighting unit along a parabolic path to the light outlet 312.

In various embodiments, the light assembly 300 facilitates improved mixing of the LEDs 211, 212, 213, 214, 215, 216 of lighting unit 202 from FIG. 2. In this regard, due to the number of LEDs, only distance or diffusion can ensure sufficient mixture to achieve a desired effect. In various embodiments, by having the reflective surface 316 having a parabolic cross section, the circuit board 208 may be a single board design along a length of an aircraft (i.e., the circuit board 208 may extend the length of the aircraft), which may reduce cost for various lighting systems. Additionally, the half parabola shape of the reflective surface 316 may allow positioning of the lighting unit 202 at a back end of the circuit board (i.e., away from the light outlet), where the lighting unit 202 is typically disposed at a back end of the housing 310, i.e., in a negative y-direction. Thus, the reflective surface 316 is, in various embodiments, a parabolic or near parabolic reflector that integrates light from the lighting unit 202 and reflects it forward and out the light outlet 312. In various embodiments, the configuration of light assembly 300 helps with efficiency of the lighting system 200 because the configuration allows for greater directionalization of the light and gives additional mixing distance relative to typical light assemblies and system. In various embodiments, the reflective surface 316 may include a polished aluminum surface, a white plastic gloss, or the like.

Figure 4A:
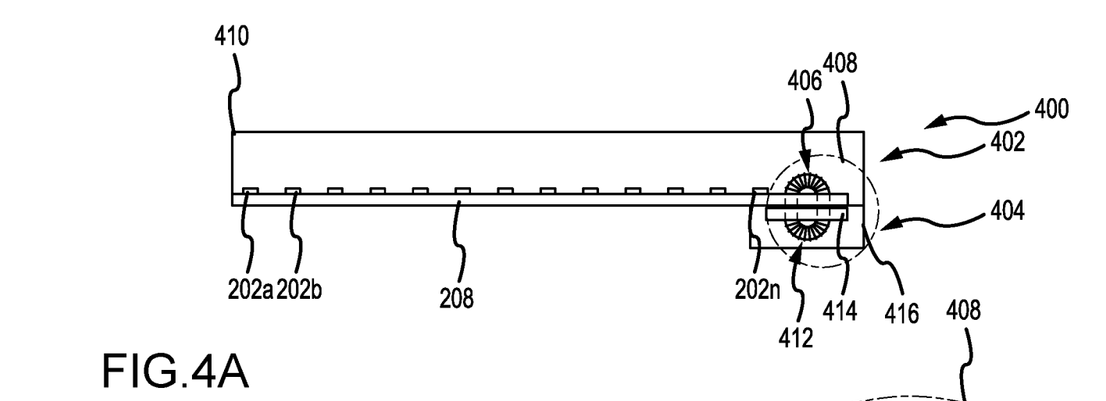
FIGS. 4A and 4B illustrate a lighting assembly with a toroid core shaped isolated power supply, in accordance with various embodiments.
Figure 4B:
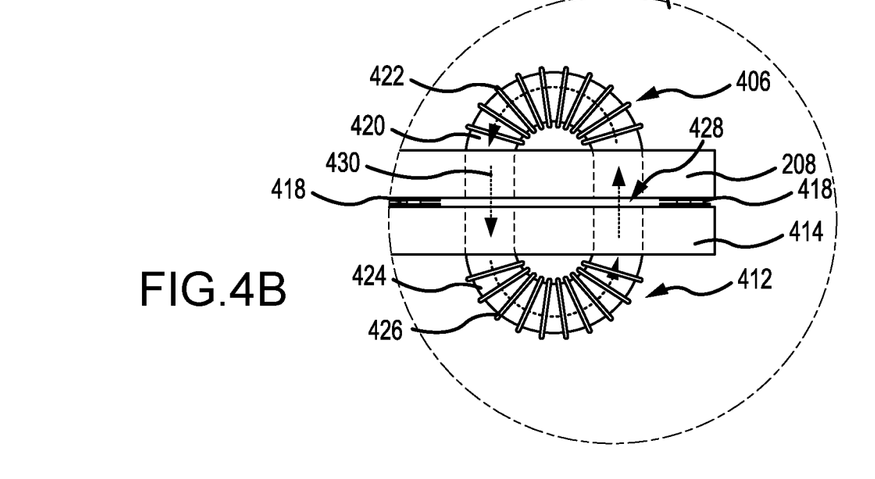

Referring now to FIGS. 4A and 4B, a lighting assembly 400 with a toroid core shaped isolated power supply is illustrated, in accordance with various embodiments. In various embodiments, the lighting assembly 400 includes a circuit module portion 402 and a power module portion 404. In various embodiments, the circuit module portion 402 may include one or more lighting units 202a-202n along a strip of circuit board 208 along with a first portion of an isolated power supply system 408 mounted to circuit board 208. In various embodiments, the one or more lighting units 202a-202n, the circuit board 208, and the first portion 406 of the isolated power supply system 408 may be housed in a first housing 410. In various embodiments, the power module portion 404 includes a second portion 412 of the isolated power supply system 408 mounted to circuit board 414. In various embodiments, the second portion 412 of the isolated power supply system 408 and the circuit board 414 may be housed within a second housing 416. In various embodiments, the power module portion 404 may be coupled to the circuit module portion 402 via mechanical board coupling devices 418 such as snap fits or screws, among others. In various embodiments, the first portion 406 of the isolated power supply system 408 and the second portion 412 of the isolated power supply system 408, form a toroid core shaped isolated power supply.

In various embodiments, the first portion 406 of the isolated power supply system 408 includes a first half magnetic core 420 with a first set of windings 422 and the second portion 412 of the isolated power supply system 408 includes a second half magnetic core 424 with a second set of windings 426. In various embodiments, the power module portion 404 may be coupled to the circuit module portion 402 such that ends of the first half magnetic core 420 align with ends of the second half magnetic core 424. In various embodiments, while the ends of the first half magnetic core 420 are aligned with the ends of the second half magnetic core 424, the ends of the first half magnetic core 420 are separated from the ends of the second half magnetic core 424 by an air gap 428. In various embodiments, the air gap 428 may be between .1 millimeters (0.003937 inch) and 0.6 millimeters (0.02362 inch). In various embodiments, the air gap 428 may be between 0.2 millimeters (0.007874 inch) and 0.5 millimeters (0.01969 inch). In various embodiments, the air gap 428 may be between 0.3 millimeters (0.01181 inch) and 0.4 millimeters (0.01575 inch).

In various embodiments, the second set of windings 426 may be coupled to a power source and, responsive to electrical current being passed through the second set of windings 426, a magnetic flux 430 is generated in the second half magnetic core 424. In various embodiments, the first half magnetic core 420 and the second half magnetic core 424 are metal or metal-alloy based cores and, since the first half magnetic core 420 and the second half magnetic core 424 are metal or metal-alloy based cores, while the air gap 428 is between the first half magnetic core 420 and the second half magnetic core 424, the magnetic flux 430 generated in the second half magnetic core 424 passes to the first half magnetic core 420. In various embodiments, the magnetic flux 430 generated in the first half magnetic core 420 causes an electric current to be generated in the first set of windings 422, which is then supplied to lighting units 202a-202n via, for example, circuitry 204 and a controller 206 of FIG. 2.

In various embodiments, by splitting the first half magnetic core 420 from the second half magnetic core 424, an isolated power source is provided that, in relation to typical lighting assembly, eliminates the need for a set of connectors to be provided between a circuit module portion and a power module portion, when an isolated power source is provided as a monolithic unit. Furthermore, in various embodiments, by splitting the first half magnetic core 420 from the second half magnetic core 424, a height of the lighting assembly may be reduced as the first half magnetic core 420 is embedded in circuit board 208 and the second half magnetic core 424 is embedded in the circuit board 414. Still further, in various embodiments, by embedding the first half magnetic core 420 in circuit board 208 and embedding the second half magnetic core 424 in the circuit board 414, the lighting assembly 400 may be encased in the first housing 410 and the second housing 416. In various embodiments, the first housing 410 and the second housing 416 may be sealed plastic housings that are waterproof. In various embodiments, the first housing 410 and the second housing 416 may be the same housing.

Figure 5A:
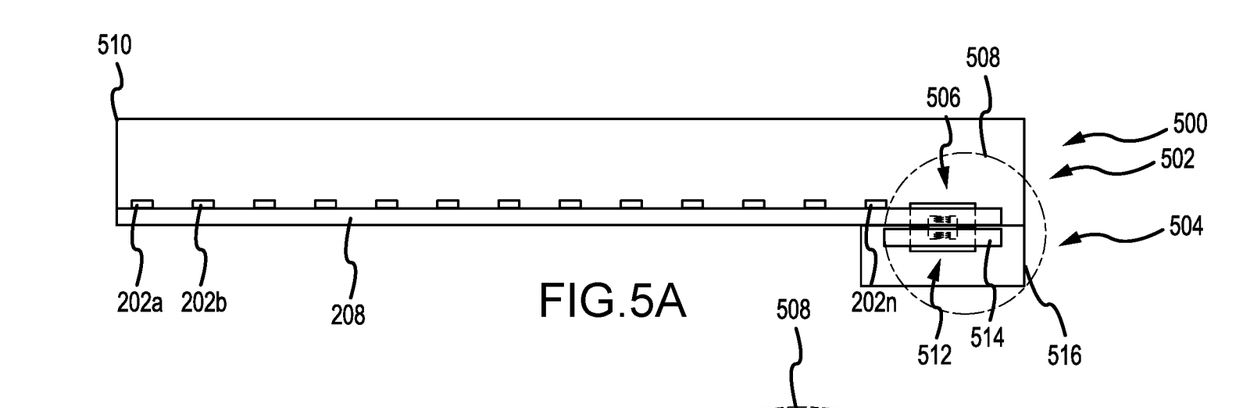
FIGS. 5A and 5B illustrate a lighting assembly with a planar core shaped isolated power supply, in accordance with various embodiments.
Figure 5B:
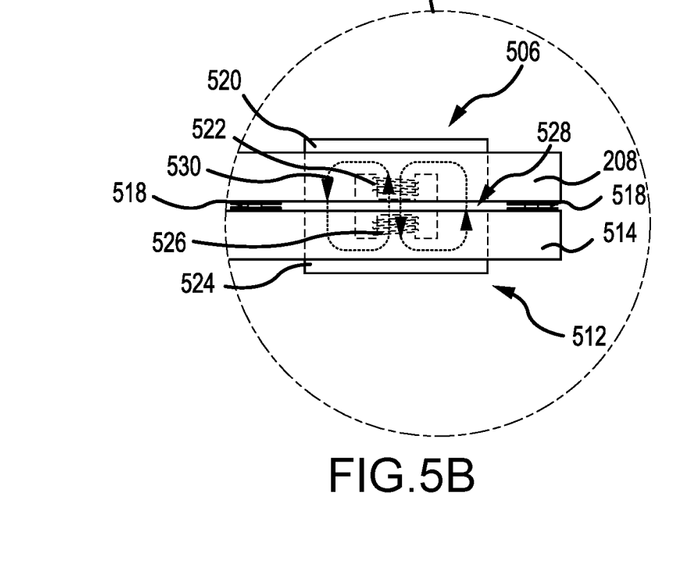

Referring now to FIGS. 5A and 5B, a lighting assembly 500 with a planar core shaped isolated power supply is illustrated, in accordance with various embodiments. In various embodiments, the lighting assembly 500 includes a circuit module portion 502 and a power module portion 504. In various embodiments, the circuit module portion 502 may include one or more lighting units 202a-202n along a strip of circuit board 208 along with a first portion 506 of an isolated power supply system 508 mounted to circuit board 208. In various embodiments, the one or more lighting units 202a-202n, the circuit board 208, and the first portion 506 of the isolated power supply system 508 may be housed in a first housing 510. In various embodiments, the power module portion 504 includes a second portion 512 of the isolated power supply system 508 mounted to circuit board 514. In various embodiments, the second portion 512 of the isolated power supply system 508 and the circuit board 514 may be housed within a second housing 516. In various embodiments, the power module portion 504 may be coupled to the circuit module portion 502 via mechanical board coupling devices 518 such as snap fits or screws, among others. In various embodiments, the first portion 506 of the isolated power supply system 508 and the second portion 512 of the isolated power supply system 508, form a shell type shaped isolated power supply, where the core encircles the winding of the transformer.

In various embodiments, the first portion 506 of the isolated power supply system 508 includes a first half magnetic core 520 with a first set of windings 522 and the second portion 512 of the isolated power supply system 508 includes a second half magnetic core 524 with a second set of windings 526. In various embodiments, the power module portion 504 may be coupled to the circuit module portion 502 such that ends of the first half magnetic core 520 align with ends of the second half magnetic core 524. In various embodiments, while the ends of the first half magnetic core 520 are aligned with the ends of the second half magnetic core 524, the ends of the first half magnetic core 520 are separated from the ends of the second half magnetic core 524 by an air gap 528. In various embodiments, the air gap 528 may be between .1 millimeters (0.003937 inch) and 0.6 millimeters (0.02362 inch). In various embodiments, the air gap 528 may be between 0.2 millimeters (0.007874 inch) and 0.5 millimeters (0.01969 inch). In various embodiments, the air gap 528 may be between 0.3 millimeters (0.01181 inch) and 0.4 millimeters (0.01575 inch).

In various embodiments, the second set of windings 526 may be coupled to a power source and, responsive to electrical current being passed through the second set of windings 426, a magnetic flux 530 is generated in the second half magnetic core 524. In various embodiments, the first half magnetic core 520 and the second half magnetic core 524 are metal or metal-alloy based cores and, since the first half magnetic core 520 and the second half magnetic core 524 are metal or metal-alloy based cores, while the air gap 528 is between the first half magnetic core 520 and the second half magnetic core 524, the magnetic flux 530 generated in the second half magnetic core 524 passes to the first half magnetic core 520. In various embodiments, the magnetic flux 530 generated in the first half magnetic core 520 causes an electric current to be generated in the first set of windings 522, which is then supplied to lighting units 202a-202n via, for example, circuitry 204 and a controller 206 of FIG. 2.

In various embodiments, by splitting the first half magnetic core 520 from the second half magnetic core 524, an isolated power source is provided that, in relation to typical lighting assembly, eliminates the need for a set of connectors to be provided between a circuit module portion and a power module portion, when an isolated power source is provided as a monolithic unit. Furthermore, in various embodiments, by splitting the first half magnetic core 520 from the second half magnetic core 524, a height of the lighting assembly may be reduced as the first half magnetic core 520 is embedded in circuit board 208 and the second half magnetic core 524 is embedded in the circuit board 514. Still further, in various embodiments, by embedding the first half magnetic core 520 in circuit board 208 and embedding the second half magnetic core 524 in the circuit board 514, the lighting assembly 500 may be encased in the first housing 510 and the second housing 516. In various embodiments, the first housing 510 and the second housing 516 may be sealed plastic housings that are waterproof. In various embodiments, the first housing 510 and the second housing 516 may be the same housing.

Figure 6A:
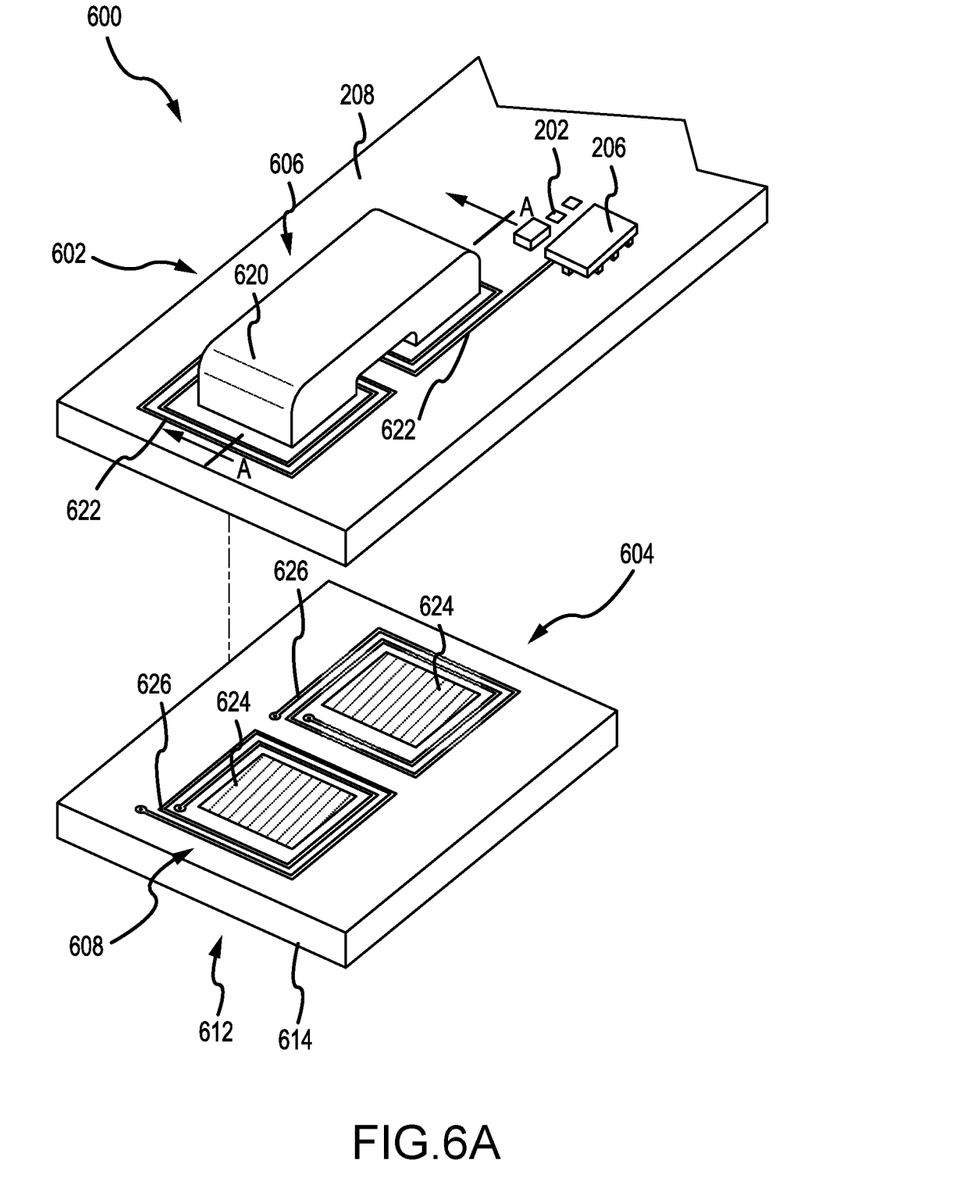
FIGS. 6A and 6B illustrate a lighting assembly with a planar shaped isolated power supply, according to various embodiments.
Figure 6B:
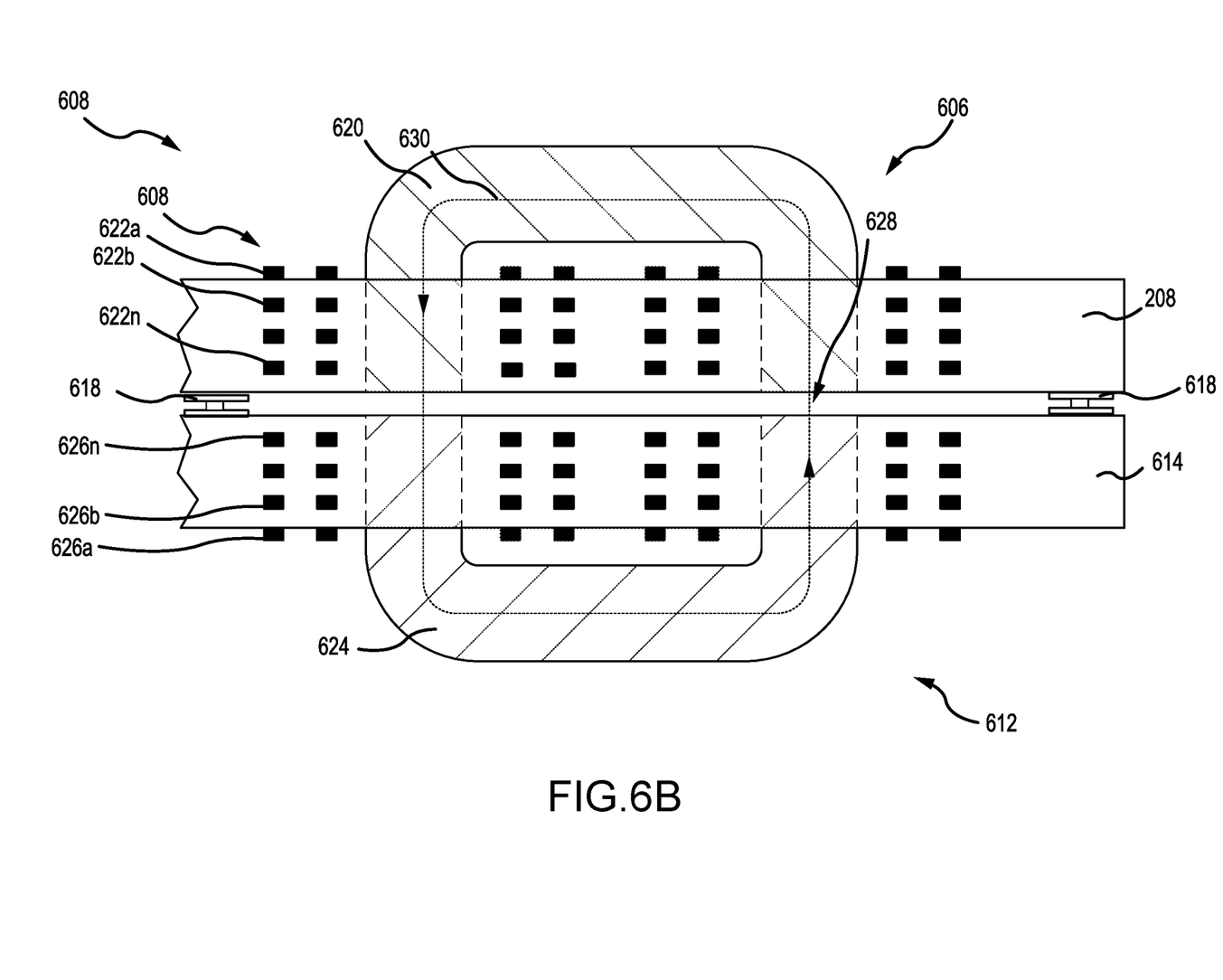

Referring now to FIGS. 6A and 6B, a lighting assembly 600 with a planar shaped isolated power supply is illustrated, in accordance with various embodiments. In various embodiments, the lighting assembly 600 includes a circuit module portion 602 and a power module portion 604. In various embodiments, the circuit module portion 602 may include one or more lighting units 202 along a strip of circuit board 208 along with a first portion 606 of an isolated power supply system 608 mounted to circuit board 208. In various embodiments, the one or more lighting units 202, the circuit board 208, and the first portion 606 of the isolated power supply system 608 may be housed in a first housing, such as the first housing 410 of FIGS. 4A and 4B or the first housing 510 of FIGS. 5A and 5B. In various embodiments, the power module portion 604 includes a second portion 612 of the isolated power supply system 608 mounted to circuit board 614. In various embodiments, the second portion 612 of the isolated power supply system 608 and the circuit board 614 may be housed within a second housing, such as the second housing 416 of FIGS. 4A and 4B or the second housing 516 of FIGS. 5A and 5B. In various embodiments, the power module portion 604 may be coupled to the circuit module portion 602 via mechanical board coupling devices 618 such as snap fits or screws, among others. In various embodiments, the first portion 606 of the isolated power supply system 608 and the second portion 612 of the isolated power supply system 608, form a planar core shaped isolated power supply.

In various embodiments, the first portion 606 of the isolated power supply system 608 includes a first half magnetic core 620 with a first set of windings 622 and the second portion 612 of the isolated power supply system 608 includes a second half magnetic core 624 with a second set of windings 626. In various embodiment, the first set of windings 622 may have an initial winding 622a beginning on a first side of the first half magnetic core 620 that is on the surface of the circuit board 208 with additional windings 622b-622n spiraling downward in a first direction into different layers within the circuit board 208. In various embodiments, once the lower winding 622n is reached, the lower winding crosses over to a second side of the first half magnetic core 620 and spirals upward in a second direction back to the surface of the circuit board 208. In various embodiments, the second direction is opposite of the first direction. In various embodiments, the second set of windings 626 may have an initial winding 622a beginning on a first side of the second half magnetic core 624 that is on the surface of the circuit board 614 with additional windings 626b-626n spiraling upward in the second direction into different layers within the circuit board 614. In various embodiments, once the highest winding 626n is reached, the highest winding crosses over to a second side of the second half magnetic core 624 and spirals downward in the first direction back to the surface of the circuit board 614. In various embodiments, the power module portion 604 may be coupled to the circuit module portion 602 such that ends of the first half magnetic core 620 align with ends of the second half magnetic core 624. In various embodiments, while the ends of the first half magnetic core 620 are aligned with the ends of the second half magnetic core 624, the ends of the first half magnetic core 620 are separated from the ends of the second half magnetic core 624 by an air gap 628. In various embodiments, the air gap 628 may be between 0.1 millimeters (0.003937 inch) and 0.6 millimeters (0.02362 inch). In various embodiments, the air gap 628 may be between 0.2 millimeters (0.007874 inch) and 0.5 millimeters (0.01969 inch). In various embodiments, the air gap 628 may be between 0.3 millimeters (0.01181 inch) and 0.4 millimeters (0.01575 inch).

In various embodiments, the second set of windings 626 may be coupled to a power source and, responsive to electrical current being passed through the second set of windings 626, a magnetic flux 630 is generated in the second half magnetic core 624. In various embodiments, the first half magnetic core 620 and the second half magnetic core 624 are metal or metal-alloy based cores and, since the first half magnetic core 620 and the second half magnetic core 624 are metal or metal-alloy based cores, while the air gap 628 is between the first half magnetic core 620 and the second half magnetic core 624, the magnetic flux 630 generated in the second half magnetic core 624 passes to the first half magnetic core 620. In various embodiments, the magnetic flux 630 generated in the first half magnetic core 620 causes an electric current to be generated in the first set of windings 622, which is then supplied to lighting units 202 via, for example, circuitry 204 of FIG. 2 and the controller 206.

In various embodiments, by splitting the first half magnetic core 620 from the second half magnetic core 624, an isolated power source is provided that, in relation to typical lighting assembly, eliminates the need for a set of connectors to be provided between a circuit module portion and a power module portion, when an isolated power source is provided as a monolithic unit. Furthermore, in various embodiments, by splitting the first half magnetic core 620 from the second half magnetic core 624, a height of the lighting assembly may be reduced as the first half magnetic core 620 is embedded in circuit board 208 and the second half magnetic core 624 is embedded in the circuit board 614. Still further, in various embodiments, by embedding the first half magnetic core 620 in circuit board 208 and embedding the second half magnetic core 624 in the circuit board 614, the lighting assembly 600 may be encased in housings 610 and 616. In various embodiments, the housings 610 and 616 may be sealed plastic housings that are waterproof.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C. B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lighting unit comprising:
a first circuit board;
a second circuit board;
a light array mounted on the first circuit board and comprising a plurality of light emitting diodes (LEDs);
a controller mounted on the first circuit board and coupled to the light array;
a first portion of an isolated power supply system mounted on the first circuit board and coupled to the controller, wherein the first portion of the isolated power supply system comprises a first half magnetic core and a first set of windings; and
a second portion of the isolated power supply system mounted on the second circuit board, wherein the second portion of the isolated power supply system comprises a second half magnetic core and a second set of windings,
wherein the first circuit board is coupled to the second circuit board so that a magnetic flux generated in the first half magnetic core is passed to the second half magnetic core in response to a first electric current being generated in the second set of windings,
wherein a second electric current is generated in the first set of windings due to the magnetic flux is utilized by the controller to control and power the light array, and
wherein the first circuit board is coupled to the second circuit board utilizing a mechanical board coupling device.

2. The lighting unit of claim 1, wherein the first half magnetic core is at least partially embedded in the first circuit board and wherein the second half magnetic core is at least partially embedded in the second circuit board.

3. The lighting unit of claim 1, wherein the first set of windings is wrapped around a first exposed portion of the first half magnetic core and wherein the second set of windings is wrapped around a second exposed portion of the second half magnetic core.

4. The lighting unit of claim 1, wherein the first set of windings is at least partially wrapped around a portion of the first half magnetic core embedded in the first circuit board and wherein the second set of windings is at least partially wrapped around a portion of the second half magnetic core embedded in the second circuit board.

5. The lighting unit of claim 1, wherein the first half magnetic core and the second half magnetic core are separated by an air gap when the first circuit board is coupled to the second circuit board.

6. The lighting unit of claim 1, wherein the first portion of the isolated power supply system, the first circuit board, and the controller are enclosed in a first housing and wherein the second portion of the isolated power supply system and the second circuit board are enclosed in a second housing, wherein the first housing and the second housing are waterproof housings.

7. The lighting unit of claim 1, wherein the first half magnetic core and the second half magnetic core together form a toroid shape magnetic core.

8. The lighting unit of claim 1, wherein the first half magnetic core and the second half magnetic core together form a shell shape magnetic core.

9. The lighting unit of claim 1, wherein the first half magnetic core and the second half magnetic core together form a planar shape magnetic core.

10. A light assembly for an aircraft cabin, comprising:
a housing defining a mating surface, a reflective surface, the housing having a back end being distal from a front end, the front end including a light outlet; and
a lighting unit disposed proximate the back end, the lighting unit comprising:
a first circuit board;
a second circuit board;
a light array mounted on the first circuit board and comprising a plurality of light emitting diodes (LEDs);
a controller mounted on the first circuit board and coupled to the light array;
a first portion of an isolated power supply system mounted on the first circuit board and coupled to the controller, wherein the first portion of the isolated power supply system comprises a first half magnetic core and a first set of windings; and
a second portion of the isolated power supply system mounted on the second circuit board, wherein the second portion of the isolated power supply system comprises a second half magnetic core and a second set of windings,
wherein the first circuit board is coupled to the second circuit board so that a magnetic flux generated in the first half magnetic core is passed to the second half magnetic core in response to a first electric current being generated in the second set of windings,
wherein a second electric current is generated in the first set of windings due to the magnetic flux is utilized by the controller to control and power the light array, and
wherein the first circuit board is coupled to the second circuit board utilizing a mechanical board coupling device.

11. The light assembly of claim 10, wherein the first half magnetic core is at least partially embedded in the first circuit board and wherein the second half magnetic core is at least partially embedded in the second circuit board.

12. The light assembly of claim 10, wherein the first set of windings is wrapped around a first exposed portion of the first half magnetic core and wherein the second set of windings is wrapped around a second exposed portion of the second half magnetic core.

13. The light assembly of claim 10, wherein the first set of windings is at least partially wrapped around a portion of the first half magnetic core embedded in the first circuit board and wherein the second set of windings is at least partially wrapped around a portion of the second half magnetic core embedded in the second circuit board.

14. The light assembly of claim 10, wherein the first half magnetic core and the second half magnetic core are separated by an air gap when the first circuit board is coupled to the second circuit board.

15. The light assembly of claim 10, wherein the first portion of the isolated power supply system, the first circuit board, and the controller are enclosed in a first housing and wherein the second portion of the isolated power supply system and the second circuit board are enclosed in a second housing, wherein the first housing and the second housing are waterproof housings.

16. The light assembly of claim 10, wherein the first half magnetic core and the second half magnetic core together form a toroid shape magnetic core.

17. The light assembly of claim 10, wherein the first half magnetic core and the second half magnetic core together form a shell shape magnetic core.

18. The light assembly of claim 10, wherein the first half magnetic core and the second half magnetic core together form a planar shape magnetic core.

\* \* \* \* \*

UNITED STATES PATENT AND TRADEMARK OFFICE
CERTIFICATE OF CORRECTION

PATENT NO. : 12,146,642 B1  
APPLICATION NO. : 18/311122  
DATED : November 19, 2024  
INVENTOR(S) : Eric Johannessen Page 1 of 1

It is certified that error appears in the above-identified patent and that said Letters Patent is hereby corrected as shown below:

On the Title Page

Item (65) please insert -- Prior Publication Data US 2024-0369213 A1 Nov 7, 2024 --

Signed and Sealed this
Twenty-second Day of April, 2025

Coke Morgan Stewart
*Acting Director of the United States Patent and Trademark Office*